Nov. 5, 1935.  A. KADOW  2,020,031
METHOD OF FORMING GLASS ARTICLES
Filed July 3, 1933   5 Sheets-Sheet 4

Nov. 5, 1935.  A. KADOW  2,020,031
METHOD OF FORMING GLASS ARTICLES
Filed July 3, 1933  5 Sheets-Sheet 5

Inventor
August Kadow
By Barnett & Truman
Attorneys.

Patented Nov. 5, 1935

2,020,031

UNITED STATES PATENT OFFICE 2,020,031

METHOD OF FORMING GLASS ARTICLES

August Kadow, Toledo, Ohio, assignor to The Libbey Glass Manufacturing Company, Toledo, Ohio, a corporation of Ohio Application July 3, 1933, Serial No. 678,878

29 Claims. (Cl. 49—80)

This invention relates to a new and improved method of forming glass articles, and more particularly to an improved method for withdrawing initially hollow glass blanks from a pool of molten glass and subsequently expanding these blanks to give the desired form to the finished hollow glass articles. An improved form of apparatus for carrying out this method is disclosed and claimed in the copending application of Kadow and Van Ness, Serial No. 678,877, filed of even date herewith.

Briefly described, this method consists in partially immersing a form or plunger in a pool of molten glass and controlling the temperature of the form with relation to the temperature of the glass so that a hollow glass blank of substantially predetermined thickness will be formed within the molten pool on the exterior of the form. Suction is applied through the form or plunger so as to draw a neck portion of the blank into a neck mold positioned adjacent the surface of the pool about the upper portion of the plunger. As the plunger is lifted from the pool, this neck portion assists in supporting the remainder of the hollow blank, and the plunger is lifted from contact with the interior of the blank soon after its formation so that the hollow blank will be suspended entirely from this neck portion. Any trailing glass is then cut away from the lower end of the blank, and the blank is expanded to the desired form within a mold or other suitable shaping device by fluid pressure applied downwardly through the upper open neck portion. The suspended blank is preferably rotated prior to and during this blowing operation to assist in shaping the glass article. When the blowing and cooling operations have been completed, the sectional neck mold is opened to release the finished glass article.

The principal object of this invention is to provide an improved method of forming glass articles, such as briefly described hereinabove and disclosed more in detail in the specifications which follow.

Another object is to provide an improved method for forming initially hollow glass blanks.

Another object is to provide an improved method for drawing initially hollow glass blanks from a pool of molten glass.

Another object is to provide an improved method for forming an initially hollow glass blank and shaping the entire blank to form the finished hollow glass article.

Other objects and advantages of this invention will be more apparent from the following detailed description of the successive steps of the method as preferably carried out by certain approved forms of apparatus designed especially for this purpose.

Those portions of the apparatus which are more directly concerned with the glass-working operation include the furnace A which incloses and maintains the pool of molten glass from which the glass blanks are drawn, and the glass-working or gathering head B which is movable into and out of the furnace to gather the glass blanks. This head in turn comprises a gathering form or plunger C which is immersed in the molten pool and about which the blank is formed, and a neck mold or neck ring D in which the upper portion of the blank is formed and from which the blank is supported during the blowing operations. The glass-working head B is carried at the lower end of a rotatable spindle E, suitable means being provided for lowering and raising this spindle for the blank drawing operations, and for rotating the spindle during the blowing operation. A cut-off device F is provided to sever the trailing glass from the blank after it is withdrawn from the molten pool, and an air jet device G is employed to blow this trailing glass to one side after it is cut away from the blank. The sectional blow-mold or finishing mold H is moved into position about the suspended blank, and the blank is expanded to the desired form within this mold, and a suitable take-out mechanism indicated at K is provided for disposing of the finished glassware when released from the blow-mold.

Figure 10:
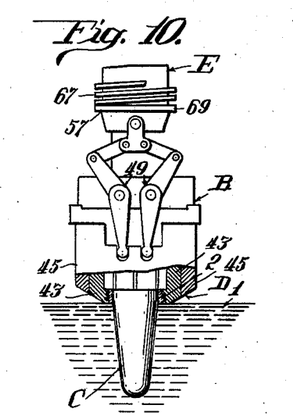
Figs. 10 to 16 inclusive are a series of diagrammatic views illustrating the successive glass-working operations.
Figure 11:
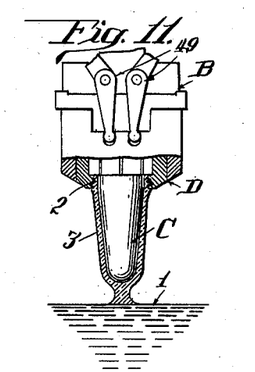
Figure 12:
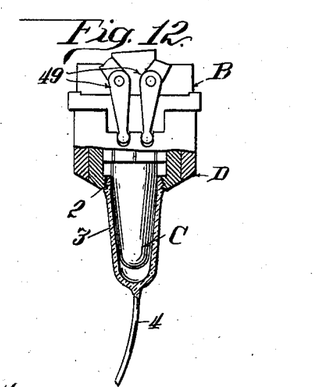
Figure 13:
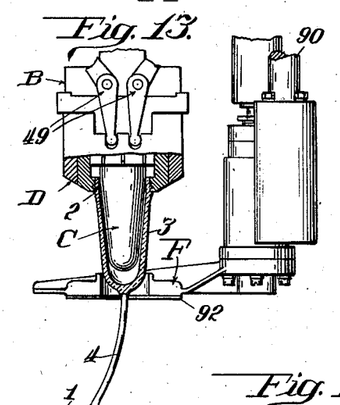
Figure 14:
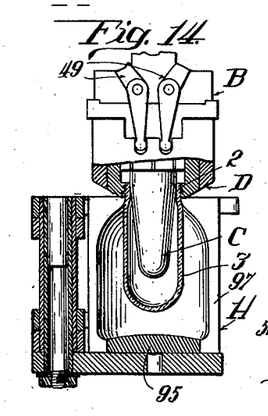
Figure 15:
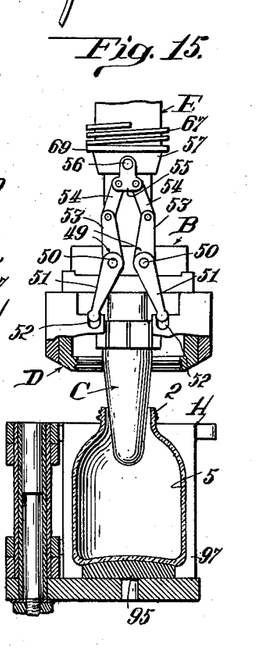

These mechanisms will be described more in detail hereinafter, but a brief description of the glass-working operations will first be given referring more particularly to the diagrammatic illustrations in Figs. 10 to 16 inclusive. The glass-working head B is first lowered to substantially the position shown in Fig. 10 so that the form or plunger C will be projected downwardly into and partially immersed in the pool 1 of molten glass, and the lower edge of the neck mold D will be brought adjacent the surface of the glass pool so that molten glass may be sucked into this neck mold to form the neck portion 2 of the glass blank. Internal passages are provided in the working head establishing vacuum connections to the neck mold for drawing glass up into this mold, as well as passages for circulating cooling water through the interior of the plunger C so that its temperature may be properly regulated relative to the temperature of the molten glass. A hollow glass blank 3 of predetermined wall thickness will be formed about the plunger and will be withdrawn from the pool as the working head is lifted as indicated in Fig. 11. The thickness of the glass blank is controlled by regulating the relative temperatures of the form or plunger C and of the molten glass and the length of time the cooled plunger remains in the glass pool and the rate of speed at which it is withdrawn from the pool, and as will be hereinafter described, means may be provided for exerting suction at different locations on the exterior of form C to assist in this glass gathering operation. Soon after the plunger and blank have been withdrawn from the pool of molten glass, the plunger C is elevated in the working head B relative to the neck mold D which supports the blank 3 so as to separate the plunger from the interior of the blank, as shown in Fig. 12, and a puff of air is admitted into the blank to slightly expand it. When the blank has been raised to a suitable height, as shown in Fig. 13, the cut-off mechanism F consisting of a pair of co-operating knives or shears operates to sever the trailing glass 4 directly beneath the bottom of the blank, this trailing glass being blown to one side of the draw-pot by the air jet device G, as will be hereinafter described. When the working head has been completely elevated to the position shown in Figs. 2 and 14, connections will be established for rotating the head and the blank 3 carried thereby, and the finishing mold or blow-mold H will be moved into position about the blank as shown in these figures. The still molten blank will then be expanded by internal air pressure supplied through the spindle and gathering head to form the finished glass article 5 as indicated in Fig. 15. When the blowing operation has been completed, the neck mold sections will be opened or separated so as to release the neck 2 of the article and the spindle and head B will be raised a short distance to free the plunger C from the neck portion 2 of the glass article, (all as shown in Fig. 15) after which the mold H is swung downwardly and toward the left from the position shown in Fig. 15, and at the same time the two sections of the mold are separated to release the glass article 5. When the mold has reached substantially the horizontal position shown in Fig. 16, the glass article 5 will be dropped out onto a suitable take-out mechanism K. The mold H is then swung to a substantially inverted position so that it will be entirely out of the way of the spindle mechanism, at which time means is applied for cooling and spraying the mold sections. This cooling operation takes place while the working head B is again being lowered to gather a new blank of glass, after which the cycle of operations hereinabove described is repeated.

Portions of a preferred form of apparatus for carrying out this process are disclosed in the accompanying drawings, but only those elements of the apparatus which are directly concerned with the glass working operations will be described in detail. The mechanisms for supporting these elements and operating them in properly timed relation will only be generally referred to, a more complete disclosure of these mechanisms being given in the copending application Serial No. 678,877 hereinabove referred to, wherein this apparatus is claimed.

The furnace structure indicated generally at A for supporting and containing the molten pool 1 may be built up as usual of refractory blocks supported by an outer metallic framework or skeleton. The furnace will ordinarily comprise a melting tank in which the molten glass is formed, and the draw-tank into which this molten glass flows, a portion of this tank being indicated in Fig. 1. Suitable burners may be provided, as is usual in this glass-working art, to maintain the molten glass in this draw-tank at the proper temperature. A plurality of the glass working machines hereinafter described may be positioned in rows along the sides of the draw-tank, and separate portions of the glass pool 1 may be partially isolated to form separate draw-pots for the different machines by means of suspended partitions 6, and adjustable curtain blocks 7 which form the rear walls of the draw-pots. The top of each draw-pot or inclosure is completely closed by the roof 8 except for the draw opening 9 through which the working head B is projected downwardly to the gathering position shown in Fig. 1.

The glass-working machine or unit is mounted on a carriage indicated generally at M which is supported by wheels 10 movable on rails 11 mounted on the horizontal frame beams 12. The ends of the beams 12 remote from the furnace are pivotally mounted at 13 on upright posts 14, the ends of the beams 12 adjacent the furnace being supported on beams or posts 15 by means of the adjustable jack devices 16 so that the elevation of the machine may be adjusted to compensate for changes in the level of the glass pool 1. The entire machine may be moved back along the rails 11 when not in service, or when repairs or adjustments are to be made, but when in operating position as shown in Fig. 1, the carriage is locked in place by the adjustable positioning means indicated generally at 17.

The assembly of cams and gears indicated generally at N is continuously rotated by the motor 18 through gearing indicated generally at 19. The cam assembly N actuates substantially all of the moving parts of the apparatus in properly timed relation to one another through intermediate connections which will not be herein described in detail, but which are disclosed in my copending application hereinabove referred to.

The spindle E which carries the glass-working head B at its lower end is rotatably mounted in a spindle carriage 20 adjustably mounted on the rack 21 which is vertically movable in suitable slideways in the carriage frame. The gear 22 meshing with this rack 21 (see Fig. 3) is rotated at suitable times and speeds and in the proper direction by the actuating mechanism N so as to lower and raise the working head B for the blank-gathering operation, and to permit suitable dwells when the working head is lowered to gather the blank and when the head is elevated and the blowing operation is taking place.

Figure 1:
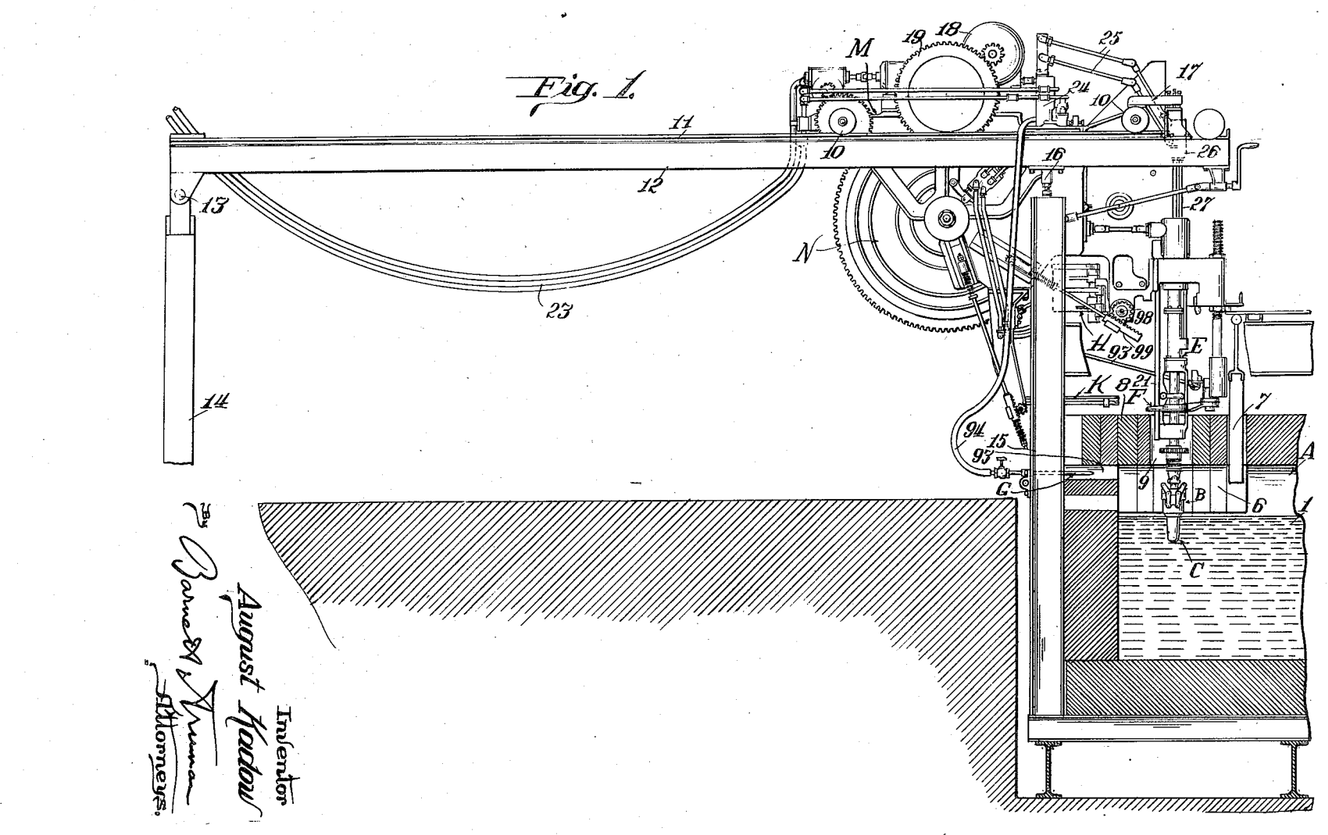
Fig. 1 is a side elevation of the assembled apparatus, with some parts broken away or in section, showing the gathering head lowered into the furnace to draw a blank of glass.

The several operating fluids used in this process (low-pressure air, high-pressure air, vacuum, and cooling water) are conducted to and from the machine through the looped conduits indicated generally at 23 (Fig. 1). One of these conduits also carries the electric wiring for supplying power to the motors. The valved distributing head 24 positioned on the carriage is connected through the hinged conduits 25 with a distributing head 26 positioned at the upper end of rack 21. The working fluids are conducted from distributing head 26 to the several passages in the rotatable spindle E (as hereinafter described) through the conduit connections indicated generally at 27.

The rotatable spindle E comprises a plurality of nested tubes 28, 29, 30 and 31. The outermost tube 31 is the supporting shell which suspends the head B and neck mold D, the shell being rotatably supported in the spindle carriage 20 as indicated at 32. The inner group of tubes 28, 29 and 30 are slidable vertically within the outer tubes or shell 31 (by means of a pump mechanism mounted in the upper portion of the spindle structure and operated by high-pressure air) so as to elevate the plunger or form C with relation to the neck mold D and detach the plunger from contact with the interior of the glass blank 3 (see Fig. 12). The tube 30 has a slidable fit directly within the outer shell 31 but is preferably keyed thereto to rotate therewith, and is threaded at its lower end 33 into the head 34 of the plunger C. The next inner tube 29 is spaced from tube 30 by the spider 35 so as to provide an intermediate annular passage 36 serving as the conduit for the pressure air and vacuum which are supplied to the neck mold D and the blank-forming element C. The lower end of pipe 29 is secured in head 34 by the pipe threads 37. The innermost tube 28 is spaced from tube 29 by spider 38 so as to provide an intermediate passage 39, the cooling water for the plunger C flowing down through tube 28 into the interior of the plunger or form and then flowing out through the annular passage 39. The form C is hollow so as to provide an interior chamber 40 into which the cooling water flows through the downwardly projecting end portion 41 of tube 28 provided with the adjustable extension sleeve 42 screwed onto the lower end portion of the tube. The water in chamber 40 is displaced upwardly by the incoming water and is forced out of the spindle through annular passage 39. It is essential that the plunger C (which has an exterior conformation designed in accordance with the desired interior form and size of the glass blank 3) be maintained at such a temperature relative to the temperature of the molten glass that the glass will not be unduly chilled, but at the same time will not permanently adhere to the outer surface of the form. These temperature conditions are arrived at by designing the form C of a suitable metal and giving the form a suitable wall thickness, and the temperature maintained in different portions of the plunger may be varied somewhat by adjusting the position of the extension sleeve 42 on the water inlet tube 28. The temperature of the glass blank is also regulated by adjusting the time that the plunger C remains in direct contact with the interior of the blank before being raised to the position shown in Fig. 12 where it is out of contact with the blank.

The neck-mold or neck-ring D comprises a pair of similar half sections 43 which are adapted to be moved horizontally toward and from one another, and when closed together about the head 34 of form C the lower portions of the neck-ring inclose the annular recess 2 about the upper portion of form C into which the neck portion of the blank is drawn. This recess 2 is so formed as to give the desired finished form to the neck of the glass article, as here shown a spiral thread 44 being formed in the wall of the neck-ring so as to cast a similar thread on the neck of the glass article. Each half section 43 of the neck-mold is mounted in a cage or housing 45 which is secured to and suspended from T-shape slides 46 mounted in similar shaped slideways 47 formed in the lower surface of the supporting block 48 which is fixedly mounted on the outer sleeve or shell 31 of the spindle assembly. At each side of the gathering head, a pair of similar levers 49 are each intermediately pivoted on the cylindrical outer portions of screw bolts 50 mounted in the supporting block 48 and shell 31, the lower arm 51 of each lever engaging in a slot 52 in one of the slidable housings 45. The upper arms 53 of the two levers are connected by links 54 with a central clevis 55 thus forming a toggle. It will now be apparent that if the clevis 55 is forced downwardly this toggle will serve to spread the upper arms 53 of the two levers and force the lower arms 51 toward one another so as to firmly hold the neck-mold in closed posiiton about the head 34 of the gathering form or plunger C. On the other hand, if the clevis 55 is drawn upwardly, the lower arms 51 of the two levers will be spread apart so as to slide the housings 45 away from one another (see Fig. 15) thus opening the neck-mold and releasing the formed neck portion of the glass article 5.

The two clevises 55 at the opposite sides of the spindle are connected by bolts 56 with the lower collar portion 57 of a sleeve 58. This collar portion 57 slides on the outer surface of tube 31, and the inner end portions 59 of the bolts 56 project into vertical slots 60 formed in tube 31 so as to limit the vertical movements of the sleeve 58 and also to prevent relative rotation between the sleeve and tube. The main upper portion of sleeve 58 is spaced outwardly from the tube 31 and slides at its upper end over an annular collar 61 secured by screw-bolts 62 to the tube 31, an expansion spring 63 being housed between the sleeve and tube and abutting at its upper and lower ends against the collars 61 and 57 so as to normally force the sleeve 58 downwardly and through the clevises 55 and the toggle and lever connections holding the neck-ring D in closed position.

The spindle assembly is rotated by means of a gear 64 which is slidably keyed at 65 on the sleeve 58 and which is normally held up against a stop collar 66 secured on sleeve 58 by an expansion spring 67 which surrounds sleeve 58 and bears at its opposite ends against the lower end of the sleeve portion 68 of the gear and a collar 69 projecting outwardly from the lower portion of sleeve 58. When the working head is elevated to the blowing position shown in Figs. 2 and 3, this gear 64 moves into mesh with a constantly rotating gear (not here shown). The upper edges of the teeth on gear 64 and the lower edges of the teeth of the gear with which it meshes are beveled as indicated at 70 to facilitate engagement, and the spring 67 permits the gear 64 to yield downwardly in case the gears do not immediately mesh with one another.

A lever 71 mounted on horizontal shaft 72 (see Fig. 3) carries a roller 73 which is adapted to be swung up into engagement with the lower surface of gear 64 so as to elevate this gear relative to the spindle, against the resistance of spring 63 and thereby lift the sleeve 58 and clevises 55 and open the neck mold D. The shaft 72 is oscillated by means of suitable cam mechanism so that the neck-mold will be opened after the blowing operation is completed, as shown in Fig. 15. At the time the spindle is lowered to gather another blank of glass, the lever 71 is swung down out of the way of the spindle mechanism as indicated in dotted lines in Fig. 3.

Figure 3:
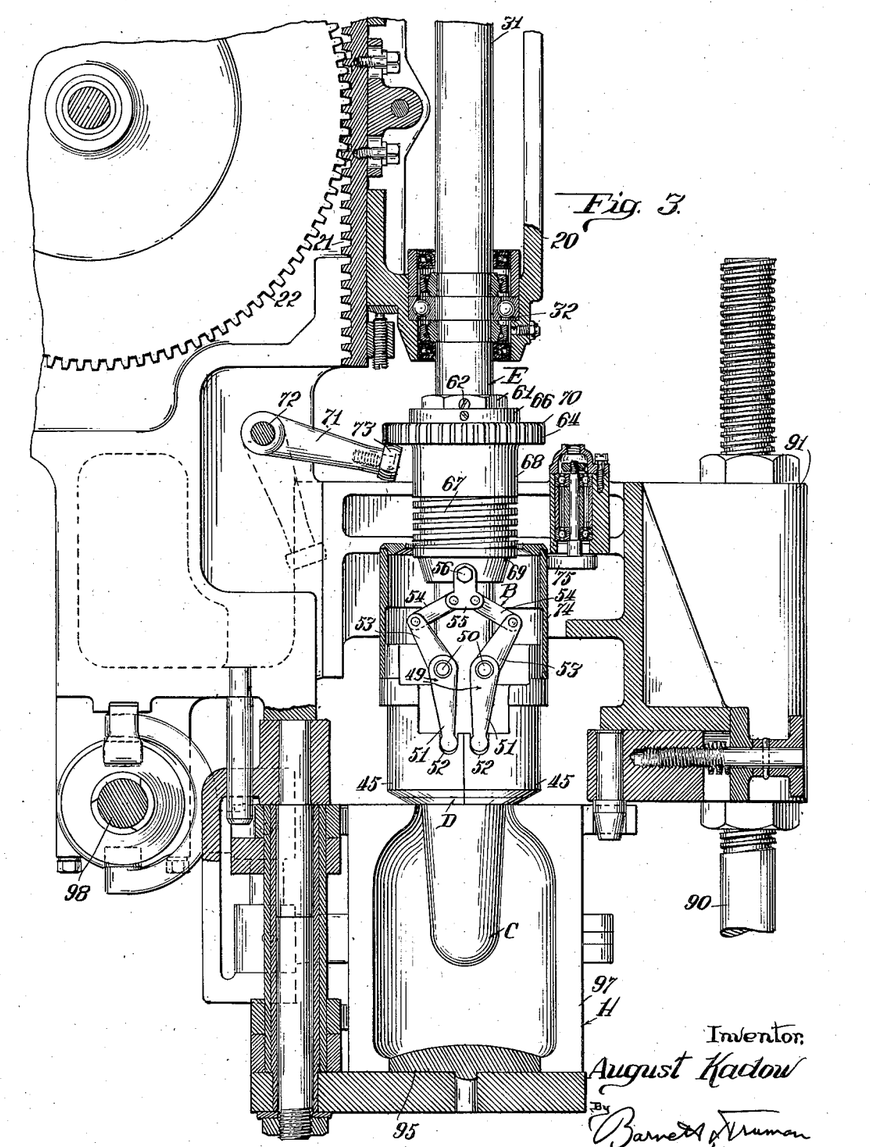
Fig. 3 is a partial side elevation in partial central vertical section showing the spindle, gathering head and blow mold assembly in the same positions as in Fig. 2.

Guide means is provided for properly centering the working head and holding it rotatably in proper position when the spindle is raised to the blowing position as shown in Fig. 3. For this purpose a cylindrical drum 74 which is fixed about the upper portion of the working head B engages between a plurality of guide rollers 75 rotatably mounted in a fixed portion of the machine carriage. In the present example there are three of these guide rollers, only one of which is shown in Fig. 3.

Figures 4, 5, 6, 7:
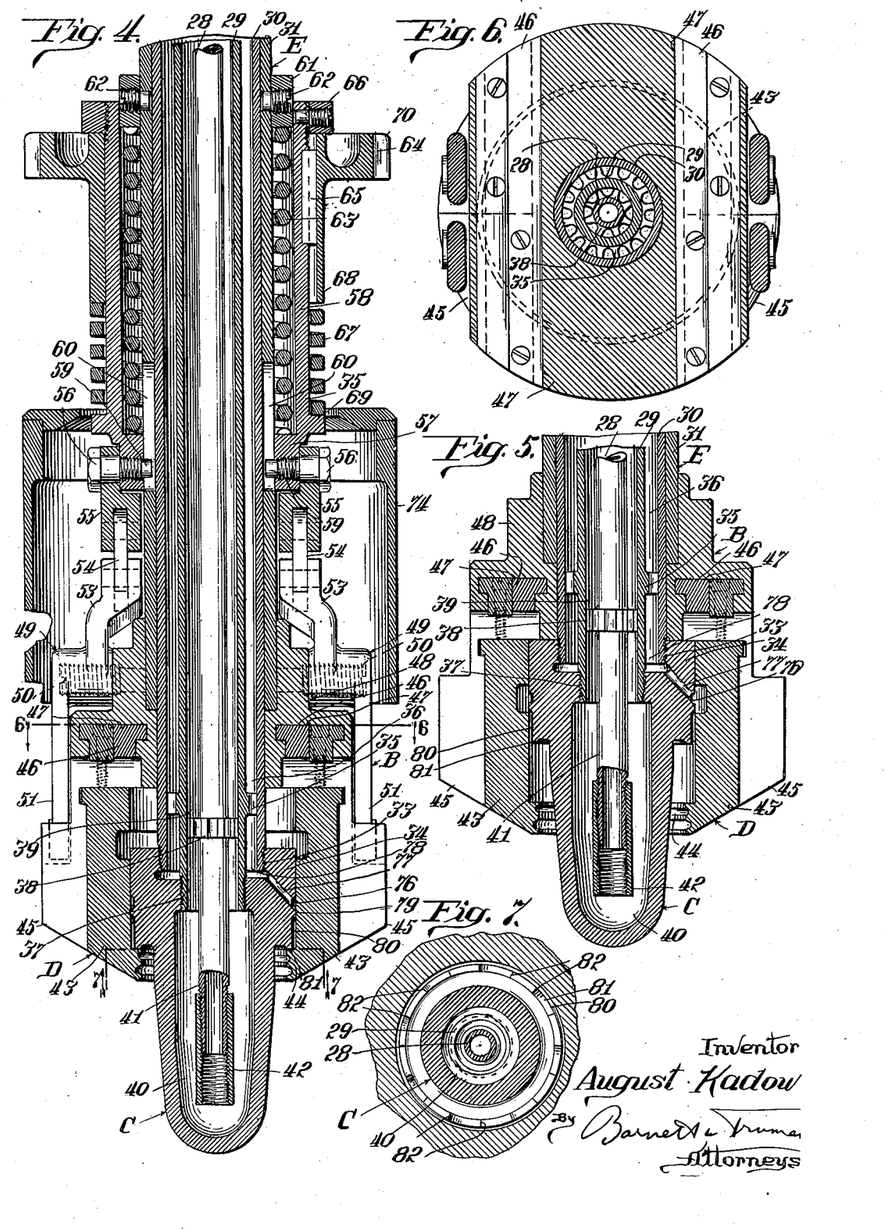
Fig. 4 is a central vertical section through the gathering head and lower portion of the spindle.
Fig. 5 is a section corresponding to the lower portion of Fig. 4, but showing the plunger in raised position.
Fig. 6 is a horizontal section, taken substantially on the line 6—6 of Fig. 4.
Fig. 7 is a horizontal section taken substantially on the line 7—7 of Fig. 4.

Referring again to Figs. 4, 5 and 7, an annular passage 76 in the exterior surface of head 34 of plunger C communicates through a passage or passages 77 with the chamber 78 in the head 34 into which leads the passage 39 in the spindle through which the pressure air or vacuum connections are made. There is a slight clearance at 79, below the annular passage 76, and the lower portion of the head is of reduced diameter at 80. The collar 81 at the lower end of the head, which rests upon the neck-ring sections when the plunger is lowered, is slightly cut away at intervals as indicated at 82 in Fig. 7. When the neck-ring sections are closed about the head 34 and the plunger is lowered, there is sufficient clearance at 76, 79, 80 and 82 between the plunger head and the neck-ring opening 2 so that suction may be exerted in this recess 2 to draw molten glass up into the neck-ring when the gathering head is lowered to the position shown in Fig. 10. When the plunger C is raised as shown in Figs. 5 and 12, pressure air may be forced through these passages and about the plunger to expand the blank 3.

Figures 2, 8, 9:
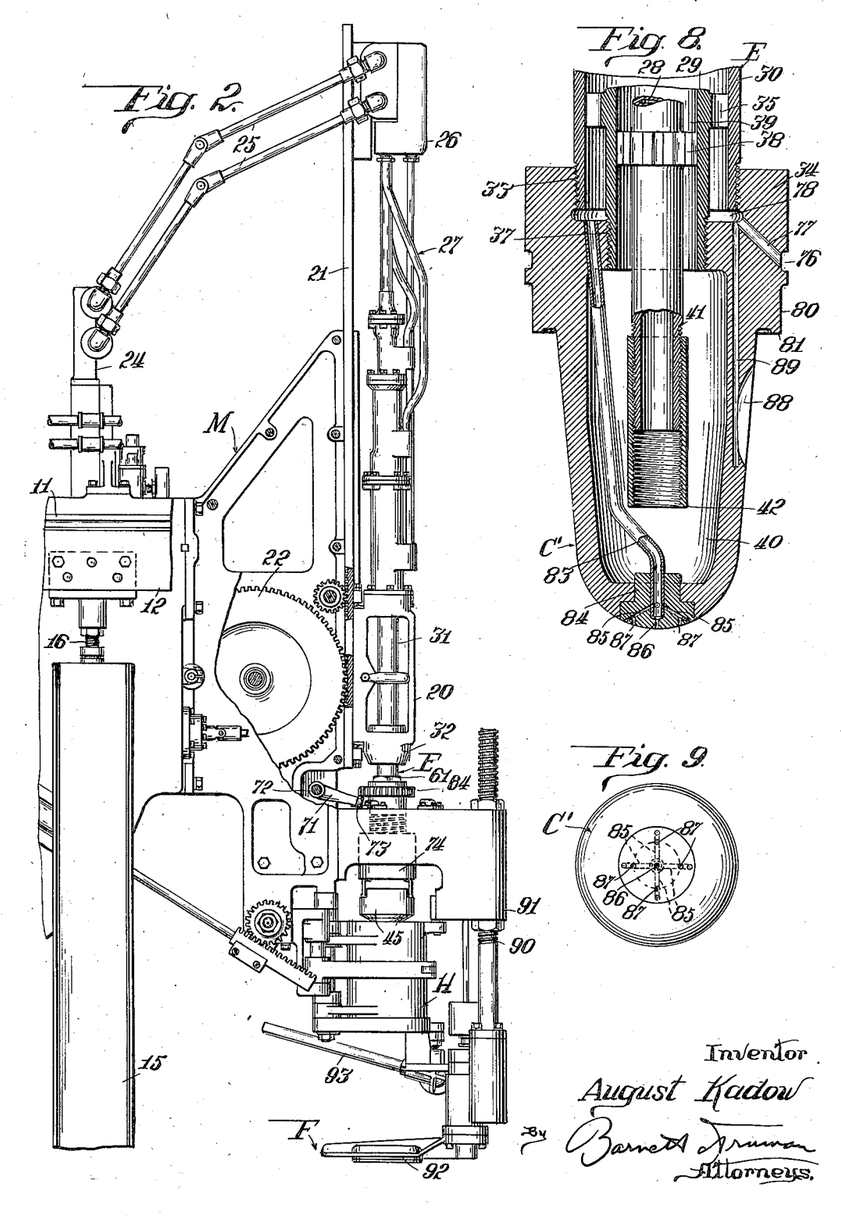
Fig. 2 is a similar side elevation of a portion of the apparatus, corresponding to the right hand portion of Fig. 1 but on a larger scale, showing the gathering head elevated and inclosed in the blow-mold.
Fig. 8 is a central vertical section through a modified form of plunger assembly.
Fig. 9 is an inverted plan view of the lower end portion of the plunger shown in Fig. 8.

The gathering form C' shown in Figs. 8 and 9 is essentially the same as the one heretofore described, with the addition of means for exerting suction at the lower tip and also at the sides of the plunger to assist in holding the glass blank to the form and preventing the blank from sagging away during the drawing operation. A conduit connection 83 leads from the fluid supply chamber 78 in the plunger head to a plug 84 mounted in the lower end of the plunger. Branch passages 85 and 86 in this plug lead to a plurality of small ports 87 in the lower surface of the plug so that suction may be exerted at a plurality of spaced points. The openings 87 are too small to permit the molten glass to be drawn thereinto. Suction may also be exerted at selected locations along the side walls of the form C' by cutting thin vertical slots 88 at spaced locations in the side wall, each of these slots being connected by a passage 89 with the upper suction chamber 78.

The cut-off mechanism F is supported by the adjustable rods or bolts 90 from a portion 91 of the carriage frame so as to be positioned directly above the upper end of the draw opening 9 in the roof of the draw-tank. This mechanism comprises a pair of knives or shears which are adapted to be opened and closed by the link 93 which is operated by a portion of the cam mechanism N. The knives are preferably internally water cooled. When the spindle is lowered, the knives are separated or opened, and when the spindle is elevated the knives close together directly beneath the blank 3 to cut off the trailing glass 4, as shown in Fig. 13. The air-jet device G which is mounted in a passage 93' in the front wall of the furnace structure A is connected through conduit 94 with a valve in the distributing head 24 on the carriage. This valve will be opened momentarily just after the cut-off operation so that a blast of air from the device G will blow the trailing glass 4 to one side of the draw-pot so that this glass, which has been partially chilled by the drawing operation, will not be directly beneath the plunger when it is again lowered into the tank to draw the next blank.

The blow-mold H comprises a bottom section 95 and a pair of similar side sections 96 and 97 which are adapted to be swung away from each other (see Fig. 16) so as to open the mold. The mold is supported from the pivotal axis 98 so that it may be swung from the opened and inverted position shown in Fig. 1 to the closed and operative position shown in Figs. 2 and 3, in which position it will be centered beneath the glass-working head B so that the blank 3 may be expanded within the mold H as indicated in Figs. 14 and 15. The mold is swung about the axis 98 from its operative to its inoperative position and vice versa, and the mold sections are opened and closed by a rack and pinion mechanism indicated generally at 99 and operated from certain cams in the operating unit N.

Figure 16:
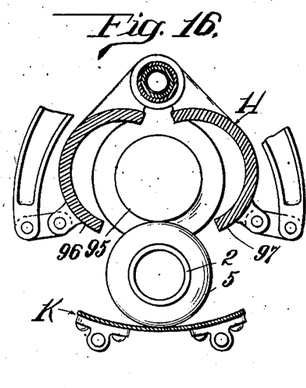

The take-out mechanism K comprises a pan or chute which will be positioned horizontally beneath the mold when the mold is swung down from the operative position shown in Fig. 15 to the horizontal position shown in Fig. 16. At this time the mold sections 96 and 97 will have been separated far enough to permit the finished glass article 5 to drop out onto the take-out chute which is subsequently tipped up to slide the glass article out into any suitable receiving means.

Means (not here disclosed in detail) are provided for spraying the mold sections when swung back to the inverted position shown in Fig. 1, and means are also provided for directing streams of cooling air against several different portions of the glass-handling elements during the gathering and blowing operations. Such mechanisms are disclosed in detail in the copending apparatus application hereinabove referred to.

It is believed that the general operation of this mechanism should now be apparent, but by way of résumé the consecutive operations taking place through one complete cycle of operation will now be briefly described. It will be understood that cooling water flows continuously through the plunger C and the spindle, and also through the cut-off knives 92. It will be assumed that a blowing operation has just been completed and one of the glass articles has been finished within the blow-mold as shown in Fig. 15. Prior to this time the spindle-assembly had been locked in its elevated position, although the spindle E is rotating. The lever 71 is now swung up to lift the gear 64 and open the neck mold, and the spindle assembly is now unlocked and is moved up a short distance so as to release the plunger from the finished glass article (as shown in Fig. 15) and the blow-mold H starts to swing down. The neck-mold operating lever 71 is now swung down to permit the neck-mold to close and the spindle moves down so as to lower the gathering head D through opening 9 into the draw-tank. The cut-off knives F are opened to permit the spindle mechanism to pass downwardly and the plunger C is lowered within the gathering head into engagement with the neck-mold D, as shown in Fig. 4. As the spindle moves downwardly, the mold H is swung back and opened to release the finished glass article onto the take-out chute K which then swings up to discharge the article. When the gathering head reaches its extreme lowered position, as shown in Figs. 1 and 10, with the plunger immersed in the molten pool, it dwells for a short time and the glass immediately adjacent the plunger C is chilled to form the body of the blank and the vacuum valve is opened to cause glass to be sucked up into the neck-mold and also to assist in the blank-gathering operation. The spindle then starts up and soon thereafter a valve is opened to admit air under high pressure to the plunger elevating mechanism within the spindle, which withdraws the plunger from the blank as shown in Figs. 5 and 12, the plunger remaining in this elevated position during the remainder of the cycle. When the head B reaches the proper elevation, the cut-off mechanism F is operated to sever the trailing glass 4, and the air-jet device G is operated to dispose of this trailing glass. At about this time certain valves in the distributing head 24 are successively opened and closed to admit puffs of air into the suspended blank to partially expand it. During this portion of the cycle the spraying mechanism has been operating on the inverted and opened blow-mold H. This spraying mechanism is particularly adapted for use with paste-molds but is also for the function of cooling the molds between successive blowing operations. As the spindle and gathering head reaches its upper position, the gear 64 on the glass-working head moves into engagement with the constantly rotating driving gear to cause a continuous rotation of the suspended glass blank, which rotation continues through the blowing operation. If paste-molds are not used, the blank-rotating mechanism may be disconnected or dispensed with. After the spindle and working head has reached this raised position it is locked against vertical movement during the comparatively long dwell while the blowing operation is taking place, and the blow-mold H is swung up and closed about the blank with the upper end of the blow-mold in operative engagement with the lower surface of the neck-mold, as shown in Fig. 3. A valve is now opened to admit low pressure air through the spindle and glass-working head to the interior of the blank 3 to expand the blank to form within the blow-mold. This completes one cycle of operations, and this cycle of operations will now be repeated as enumerated hereinabove.

By suitable changes or adjustment in the spindle raising and lowering mechanism, the time during which plunger C dwells in the molten pool, and the rate of speed at which it is withdrawn therefrom can be varied as desired to effect the thickness of the glass blank. The plunger may be partially withdrawn from the pool at one speed and the withdrawal completed at a slower speed to provide a thicker wall on the lower portion of the blank. The plunger may also be redipped or partially redipped in the pool to add to the thickness of the blank.

It will be noted that the glassworking operation itself is quite simple, there being only one neck-mold and one blow-mold used. There is no transfer of the original glass blank from one mold to another, the neck of the article being originally formed in the neck-mold during the blank-gathering operation. The main portion of the initially hollow glass blank is formed directly on the exterior surface of the immersed plunger C, and this plunger is immediately thereafter withdrawn from the blank so that the hollow blank will be suspended freely from the neck-mold D. This initially hollow blank is then inclosed in the blow-mold and expanded to finished form. No portion of the original glass blank is cut-off or discarded (with the exception of the small string of trailing glass 4 which is returned directly to the furnace), the entire blank being utilized to form the finished glass article.

I claim:

1. The method of forming hollow glass articles which comprises partially projecting a gathering tool into a mass of molten glass and withdrawing it therefrom, exerting suction through the tool and controlling the relative temperatures of the glass and tool to form a blank on the exterior of the submerged portion having a neck within the tool, the blank below the neck portion being confined only by the surrounding molten glass of the pool withdrawing the tool from the pool with the blank thereon, and applying internal fluid pressure through the tool to expand the blank while supported from the tool by the neck.

2. The method of forming hollow glass articles which comprises partially projecting a gathering tool into a mass of molten glass and withdrawing it therefrom, exerting suction through the tool and controlling the relative temperatures of the glass and tool to form a blank on the exterior of the submerged portion having a neck within the tool, the blank below the neck portion being confined only by the surrounding molten glass of the pool withdrawing the tool from the pool with the blank thereon, and separating the blank from the tool except for the neck portion by which the blank is suspended and then shaping the blank.

3. The method of forming hollow glass articles which comprises partially projecting a gathering tool into a mass of molten glass and withdrawing it therefrom, exerting suction through the tool and controlling the relative temperatures of the glass and tool to form a blank on the exterior of the submerged portion having a neck within the tool, the blank below the neck portion being confined only by the surrounding molten glass of the pool withdrawing the tool from the pool with the blank thereon, and separating the blank from the tool except for the neck portion by which the blank is suspended and then expanding the blank by fluid pressure applied through the open neck portion.

4. The method of forming hollow glass articles comprising gathering a hollow blank of substantially predetermined size and wall thickness by dipping a gathering form into a mass of molten glass, controlling the relative temperatures of the glass and the gathering form whereby the blank is gathered and formed upon the exterior surface of the submerged form from the adjacent molten glass of the mass surrounding the submerged form, withdrawing the blank from the glass mass and expanding the blank to final form by internal pressure.

5. The method of forming hollow glass articles comprising gathering a hollow blank of substantially predetermined size and wall thickness by dipping a gathering form into a mass of molten glass, controlling the relative temperatures of the glass and the gathering form whereby the blank is gathered and formed upon the exterior surface of the submerged form from the adjacent molten glass of the mass surrounding the submerged form and expanding the blank to final form by fluid pressure applied through the open upper end of the blank.

6. The method of forming a hollow glass blank of substantially predetermined wall thickness by dipping a gathering form into a mass of molten glass, exerting suction through the form, and controlling the relative temperatures of the glass and the gathering form whereby the blank is gathered and formed upon the exterior surface of the submerged form from the adjacent molten glass of the mass surrounding the submerged form.

7. The method of forming hollow glass articles comprising gathering a hollow blank of substantially predetermined size and wall thickness by dipping a gathering form into a mass of molten glass, exerting suction through the form, controlling the relative temperatures of the glass and the gathering form whereby the blank is gathered and formed upon the exterior surface of the submerged form from the adjacent molten glass of the mass surrounding the submerged form, and expanding the blank to final form by fluid pressure applied through the open upper end of the blank.

8. The method of forming hollow glass articles comprising gathering a hollow blank of substantially predetermined size and wall thickness by dipping a gathering form into a mass of molten glass, successively applying suction and fluid pressure through the form, and controlling the relative temperatures of the glass and gathering form whereby the blank is gathered on the exterior surface of the submerged form from the adjacent molten glass of the mass surrounding the submerged form, and then expanded to final form.

9. The method of forming hollow glass articles comprising gathering an initially hollow blank by partially submerging a gathering form in a mass of molten glass, controlling the relative temperatures of the glass and form, and applying suction through the form whereby a blank is formed from the surrounding molten glass on the exterior of the submerged portion of the form and a neck portion of the blank is drawn into the upper portion of the form, withdrawing the form and blank from the glass mass, and expanding the blank to final shape by pressure applied through the gathering form.

10. The method of forming hollow glass articles comprising gathering an initially hollow blank by partially submerging a gathering form in a mass of molten glass, controlling the relative temperatures of the glass and form and applying suction through the form whereby a blank is formed from the surrounding molten glass on the exterior of the submerged portion of the form and a neck portion of the blank is drawn into the upper portion of the form, withdrawing the form and blank from the glass mass, and expanding the blank to final shape by fluid pressure applied through the gathering form.

11. The method of forming hollow glass articles comprising gathering an initially hollow blank by partially submerging a gathering form in a mass of molten glass, controlling the relative temperatures of the glass and form and applying suction through the form whereby a blank is formed from the surrounding molten glass on the exterior of the submerged portion of the form and a neck portion of the blank is drawn into the upper portion of the form, withdrawing the form and blank from the glass mass, removing the trailing portion of the blank, and expanding the blank to final shape by fluid pressure applied through the gathering form.

12. The method of forming hollow glass articles comprising gathering an initially hollow blank by partially submerging a gathering form in a mass of molten glass, controlling the relative temperatures of the glass and form and applying suction through the form whereby a blank is formed from the surrounding molten glass on the exterior of the submerged portion of the form and a neck portion of the blank is drawn into the upper portion of the form, withdrawing the form and blank from the glass mass, withdrawing the lower portion of the form from contact with the interior of the blank and expanding the blank to final shape by fluid pressure applied through the gathering form.

13. The method of forming hollow glass articles comprising gathering an initially hollow blank by partially submerging a gathering form in a mass of molten glass, controlling the relative temperatures of the glass and form and applying suction through the form whereby a blank is formed from the surrounding molten glass on the exterior of the submerged portion of the form and a neck portion of the blank is drawn into the upper portion of the form, withdrawing the form and blank from the glass mass, withdrawing the lower portion of the form from contact with the interior of the blank, removing the trailing portion of the blank, and expanding the blank to final shape by fluid pressure applied through the gathering form.

14. The method of forming hollow glass articles which comprises partially projecting a gathering form into a mass of molten glass, controlling the temperature of the form and applying suction through the form whereby a hollow blank is formed from the surrounding molten glass on the exterior surface of the submerged portion of the form and a neck portion of the blank is drawn into an upper portion of the form, withdrawing the form and blank from the glass mass, withdrawing the lower portion of the form from contact with the interior of the suspended blank and partially expanding the blank by puffs of fluid under pressure applied through the gathering form, and then expanding the blank to final shape within a mold by fluid pressure applied through the gathering form while the blank is still suspended by the initially formed neck portion.

15. The method of forming hollow glass articles which comprises partially projecting a gathering form into a mass of molten glass, controlling the temperature of the form and applying suction through the form whereby a hollow blank is formed from the surrounding molten glass on the exterior surface of the submerged portion of the form and a neck portion of the blank is drawn into an upper portion of the form, withdrawing the form and blank from the glass mass, withdrawing the lower portion of the form from contact with the interior of the suspended blank, removing the trailing glass from the blank, partially expanding the blank by puffs of fluid under pressure applied through the gathering form, and then expanding the blank to final shape within a mold by fluid pressure applied through the gathering form while the blank is still suspended by the initially formed neck portion.

16. The method of forming an initially hollow glass blank of substantially predetermined size and wall thickness which consists in internally chilling a portion of the glass within a molten pool of glass, the chilled portion being confined only by the surrounding molten glass and having an open upper end at the surface of the pool, sucking glass upwardly from the pool to form a neck portion on the upper end of the blank directly above the upper surface of the pool, and then lifting the blank from the pool and suspending the blank by means of the neck portion.

17. The method of forming an initially hollow glass blank of substantially predetermined size and wall thickness which consists in projecting an internally cooled gathering plunger having a neck mold surrounding the upper portion thereof downwardly into a pool of molten glass so as to bring the neck mold adjacent the surface of the pool, the blank being formed about the plunger beneath the surface of the pool and confined only by the surrounding molten glass, sucking glass upwardly from the pool into the mold to form a neck portion on the blank adjacent the surface of the pool, elevating the plunger and mold, the blank being lifted from the pool and suspended by the neck portion, and lifting the plunger from contact with the blank.

18. The method of forming an initially hollow glass blank of substantially predetermined size and wall thickness which consists in projecting an internally cooled gathering plunger downwardly into a pool of molten glass, applying suction through the plunger, the blank being formed about the plunger beneath the surface of the pool and confined only by the surrounding molten glass, and withdrawing the plunger and blank from the pool.

19. The method of forming an initially hollow glass blank of substantially predetermined size and wall thickness which consists in projecting an internally cooled gathering plunger downwardly into a pool of molten glass, applying suction through the plunger, the blank being formed about the plunger beneath the surface of the pool and confined only by the surrounding molten glass, withdrawing the plunger and blank from the pool, and then withdrawing the plunger from the blank.

20. The method of forming an initially hollow glass blank of substantially predetermined size and wall thickness which consists in projecting an internally cooled gathering plunger downwardly into a pool of molten glass, applying suction through the plunger, the blank being formed about the plunger beneath the surface of the pool and confined only by the surrounding molten glass, forming a neck portion on the blank adjacent the surface of the pool, withdrawing the plunger and blank from the pool, the blank being suspended by the neck portion, and withdrawing the plunger from the blank.

21. The method of forming hollow glass articles which consists in internally chilling a portion of the glass within a pool of molten glass so as to form an initially hollow glass blank of substantially predetermined size and wall thickness, the blank being confined only by the surrounding molten glass, forming a neck portion on the blank adjacent the surface of the pool, withdrawing the blank from the pool and suspending the blank by means of the neck portion, and then expanding the blank to the desired form by fluid pressure applied internally through the neck.

22. The method of forming hollow glass articles which consists in internally chilling a portion of the glass within a pool of molten glass so as to form an initially hollow glass blank of substantially predetermined size and wall thickness, the blank being confined only by the surrounding molten glass, forming a neck portion on the blank adjacent the surface of the pool, withdrawing the blank from the pool and suspending the blank by means of the neck portion, and then expanding the blank to the desired form within a shaping device by fluid pressure applied internally through the neck.

23. The method of forming hollow glass articles which consists in projecting an internally cooled gathering plunger downwardly into a pool of molten glass, forming an initially hollow glass blank of substantially predetermined size and wall thickness about the submerged plunger, the blank being confined only by the surrounding molten glass, forming a neck on the blank adjacent the surface of the molten pool, withdrawing the plunger and blank from the pool, the blank being suspended by the neck portion, withdrawing the plunger from the blank, and expanding the blank to the desired form by fluid pressure applied internally through the neck portion.

24. The method of forming hollow glass articles which consists in projecting an internally cooled gathering plunger downwardly into a pool of molten glass, forming an initially hollow glass blank of substantially predetermined size and wall thickness about the submerged plunger, the blank being confined only by the surrounding molten glass, forming a neck on the blank adjacent the surface of the molten pool, withdrawing the plunger and blank from the pool, the blank being suspended by the neck portion, withdrawing the plunger from the blank, and expanding the blank to the desired form within a shaping device by fluid pressure applied internally through the neck portion.

25. The method of forming hollow glass articles which consists in projecting an internally cooled gathering plunger downwardly into a pool of molten glass, forming an initially hollow glass blank of substantially predetermined size and wall thickness about the submerged plunger, the blank being confined only by the surrounding molten glass, forming a neck on the blank adjacent the surface of the molten pool, withdrawing the plunger and blank from the pool, the blank being suspended by the neck portion, severing the trailing glass from the bottom of the blank, withdrawing the plunger from the blank, and expanding the blank to the desired form by fluid pressure applied internally through the neck portion.

26. The method of forming hollow glass articles which consists in projecting an internally cooled gathering plunger downwardly into a pool of molten glass, applying suction through the plunger and forming an initially hollow glass blank of substantially predetermined size and wall thickness about the submerged plunger, the blank being confined only by the surrounding molten glass, forming a neck on the blank adjacent the surface of the molten pool, withdrawing the plunger and blank from the pool, the blank being suspended by the neck portion, withdrawing the plunger from the blank, and expanding the blank to the desired form by fluid pressure applied internally through the neck portion.

27. The method of forming hollow glass articles which consists in projecting an internally cooled gathering plunger downwardly into a pool of molten glass, applying suction through the plunger and forming an initially hollow glass blank of substantially predetermined size and wall thickness about the submerged plunger, the blank being confined only by the surrounding molten glass, forming a neck on the blank adjacent the surface of the molten pool, withdrawing the plunger and blank from the pool, the blank being suspended by the neck portion, severing the trailing glass from the bottom of the blank, withdrawing the plunger from the blank, and expanding the blank to the desired form by fluid pressure applied internally through the neck portion.

28. The method of forming an initially hollow glass blank which consists in rapidly chilling from within that portion of the glass within a pool of molten glass immediately surrounding a submerged form so as to form within the pool a blank of substantially predetermined size and wall thickness which is confined only by the surrounding molten glass of the pool, simultaneously lifting glass from the pool to form an upper open end portion on the blank above the surface of the pool, then lifting this upper end portion to withdraw the hollow blank from the pool and suspend the blank, and lifting the form from contact with the blank through the open upper end portion of the blank.

29. The method of forming a hollow glass blank of substantially predetermined size and wall thickness, the blank being closed at its sides and bottom but open at its upper end, which consists in chilling from within that portion of the glass within a pool of molten glass immediately surrounding a partially submerged form, the chilled portion being confined only by the surrounding molten glass of the pool, the upper open end of the blank being formed adjacent the upper surface of the pool, lifting the blank from the pool and suspending the blank by means of the upper open end portion, and lifting the form from contact with the blank through the open upper end of the suspended blank.

AUGUST KADOW.